United States Patent [19]
Henson et al.

[11] Patent Number: 6,157,652
[45] Date of Patent: Dec. 5, 2000

[54] HUB PORT WITH CONSTANT PHASE

[75] Inventors: Karl M. Henson, Rancho Santa Margarita; David Brewer, Anaheim; Hossein Hashemi, Mission Viejo, all of Calif.

[73] Assignee: Emulex Corporation, Costa Mesa, Calif.

[21] Appl. No.: 09/071,932

[22] Filed: May 1, 1998

[51] Int. Cl.[7] .................................................. H04L 12/28
[52] U.S. Cl. ......................................... 370/407; 370/503
[58] Field of Search ..................... 370/407, 403, 370/404, 405, 406, 424, 503, 507, 516

[56] References Cited

U.S. PATENT DOCUMENTS

| 5,495,580 | 2/1996 | Osman | 713/400 |
|---|---|---|---|
| 5,506,846 | 4/1996 | Edem et al. | . |
| 5,522,047 | 5/1996 | Grow et al. | 709/251 |
| 5,559,796 | 9/1996 | Edem et al. | . |
| 5,638,512 | 6/1997 | Osman et al. | 713/201 |
| 5,659,718 | 8/1997 | Osman et al. | 713/400 |
| 5,687,314 | 11/1997 | Osman et al. | . |
| 5,687,356 | 11/1997 | Basso et al. | 370/400 |
| 5,701,305 | 12/1997 | Albrecht | 370/248 |
| 5,790,538 | 9/1998 | Sugar | 370/352 |

*Primary Examiner*—Hassan Kizou
*Assistant Examiner*—Daniel Prévil
*Attorney, Agent, or Firm*—Fish & Richardson P.C.

[57] ABSTRACT

A hub port which maintains a constant phase in a datastream and reduces jitter transfer to an attached node port. The hub port includes circuitry for maintaining constant bit boundaries for all data transmitted along the hub loop from that hub port using an internal clock. In addition, the internal clock is used to reduce jitter transfer.

9 Claims, 3 Drawing Sheets

HUB PORT WITH CONSTANT PHASE

TECHNICAL FIELD

The present invention relates to an electronic network switching device, and more specifically to a network hub port which synchronizes data received from an attached node port to an internal clock in order to provide internal phase control.

BACKGROUND INFORMATION

Electronic data systems are frequently interconnected using network communication systems. Area-wide networks and channels are two approaches that have been developed for computer network architectures. Traditional networks (e.g., LAN's and WAN's) offer a great deal of flexibility and relatively large distance capabilities. Channels, such as the Enterprise System Connection (ESCON) and the Small Computer System Interface (SCSI), have been developed for high performance and reliability. Channels typically use dedicated short-distance connections between computers or between computers and peripherals.

Features of both channels and networks have been incorporated into a new network standard known as "Fibre Channel". Fibre Channel systems combine the speed and reliability of channels with the flexibility and connectivity of networks. Fibre Channel products currently can run at very high data rates, such as 266 Mbps or 1062 Mbps. These speeds are sufficient to handle quite demanding applications, such as uncompressed, full motion, high-quality video. ANSI specifications, such as X3.230-1994, define the Fibre Channel network. This specification distributes Fibre Channel functions among five layers. The five functional layers of the Fibre Channel are: FC-0—the physical media layer; FC-1—the coding and encoding layer; FC-2—the actual transport mechanism, including the framing protocol and flow control between nodes; FC-3—the common services layer; and FC-4—the upper layer protocol.

There are generally three ways to deploy a Fibre Channel network: simple point-to-point connections; arbitrated loops; and switched fabrics. The simplest topology is the point-to-point configuration, which simply connects any two Fibre Channel systems directly. Arbitrated loops are Fibre Channel ring connections that provide shared access to bandwidth via arbitration. Switched Fibre Channel networks, called "fabrics", are a form of cross-point switching.

Conventional Fibre Channel Arbitrated Loop ("FC-AL") protocols provide for loop functionality in the interconnection of devices or loop segments through node ports. However, direct interconnection of node ports is problematic in that a failure at one node port in a loop typically causes the failure of the entire loop. This difficulty is overcome in conventional Fibre Channel technology through the use of hubs. Hubs include a number of hub ports interconnected in a loop topology. Node ports are connected to hub ports, forming a star topology with the hub at the center. Hub ports which are not connected to node ports or which are connected to failed node ports are bypassed. In this way, the loop is maintained despite removal or failure of node ports.

For example, FIG. 1 illustrates a hub 100 with six hub ports 102, 104, 106, 108, 110, 112 (the number of hub ports and node ports illustrated in FIG. 1 is for illustrative purposes only and does not limit the application of the technology provided by the preferred embodiment). Hub ports 102–112 are interconnected by internal hub links 114, 116, 118, 120, 122, 124. Four node ports 126, 128, 130, 132 are attached to hub ports 102, 106, 110, 112, respectively. A physical star topology is created by node ports 126–132 around hub 100. The internal connection of hub ports 102–112 by internal hub links 114–124 forms an internal loop within hub 100 and creates a loop topology among node ports 126–132.

Each node port is connected to a hub port by a pair of data channels. For example, node port 126 is connected to hub port 102 by data channels 134 and 136. Data channel 134 transmits data from hub port 102 to node port 126. Data channel 136 transmits data from node port 126 to hub port 102. In this way, a datapath is created around the loop including each of the hub ports and the node ports.

In a conventional FC-AL hub, data received by a hub port from a node port may have a bit boundary which is out of phase and synchronization relative to data received by other hub ports in the loop of the same hub. Each node port transmits data to its corresponding hub port using a clock internal to that node port. Thus each datastream introduced to the hub loop is sent with a different clock. Because the signals are sent with different clocks the bit boundaries of the signals are often out of phase relative to one another. When a node port receives a datastream from its corresponding hub port, the node port recovers the clock signal from the datastream and synchronizes the datastream to its own internal clock, such as with a phase lock loop.

Synchronization is typically detrimentally affected by switching hub ports in and out of bypass mode, such as upon the insertion and removal of node ports from the loop. Under a conventional implementation, a hub port which is connected to a node port receives two datastreams: one from the preceding hub port and one from the attached node port. The two datastreams are not necessarily synchronized because each is typically from a different node port and so has a different clock. If this switch occurs at a time which does not coincide with a bit boundary in the datastream, bit synchronization at the point in the datastream of the switch from one input to another is lost. The bit boundary shifts from that of the old datastream to that of the new datastream. Consequently, word synchronization may also be lost. When a node port attempts to recover the clock signal from this datastream, the loss of bit synchronization may prevent a successful recovery necessitating re-synchronization. The re-synchronization required consumes time as well as possibly generating errors. A similar problem occurs when a node port is initially connected to a hub port and the hub port switches out of bypass mode.

For example, in FIG. 1, hub port 106 receives data from hub port 104 and from node port 128. When hub port 106 switches to bypass mode, such as when node port 128 is disconnected, hub port 106 stops outputting data from node port 128 and switches to outputting data received from hub port 104. Because the two datastreams are not necessarily in phase this switch may cause a loss in bit synchronization. When node port 130 attempts to recover the clock signal from the datastream, the recovery may fail causing node port 130 to re-synchronize the datastream.

Under conventional FC-AL protocols, when synchronization is lost by a node port, such as by phase shifted bit boundaries, and is not recovered within a timeout period, loop initialization primitive ("LIP") primitive sequences may be generated by one or more node ports to reinitialize the loop. LIP primitive sequences are formed from three consecutive identical LIP ordered sets. LIP ordered sets are known and defined in conventional FC-AL protocols. When node ports receive a LIP primitive sequence, node ports typically end ordinary processing and may generate LIP primitive sequences of their own. Under conventional FC-AL protocols, the loop may not return to ordinary processing for as long as approximately 500 to 600 microseconds. This delay is an undesirable result of synchronization errors. In addition, some computer software applications being used across the loop may not be tolerant of the LIP process, and, at the very least, all applications experience a delay. An application may "crash" (i.e., abruptly and completely stop execution) and need to be restarted to continue processing. Such a crash increases the amount of delay experienced by users or other processes connected to the loop. In addition, data loss or data corruption may result as data storage devices may not be properly accessed upon the crash generated by the LIP process.

Accordingly, the inventors have determined that it would be desirable to provide a hub port which internally synchronizes signals passed around a loop network having characteristics similar to Fibre Channel Arbitrated Loop networks.

SUMMARY

A hub port of the preferred embodiment provides a local clock internal to the hub. The local clock provides the ability to connect or disconnect a node port or loop segment attached to the hub port without disturbing the phase or bit boundary of data received at a downstream hub port.

In one implementation, the hub port includes a smoothing circuit to synchronize data received from the attached node port to a local clock that is internal to the hub and common to all hub ports in the hub. As a result, a constant phase or bit boundary is maintained in the datastream of the hub loop. A hub port is switched in and out of bypass mode only on a bit boundary. Because the data received at a downstream hub port has a constant phase or bit boundary when a node port attached to an upstream hub port is connected or disconnected, the node port attached to the downstream hub port does not lose synchronization as a result of the change at the upstream hub port.

An additional advantage of the preferred embodiment is that the transmission of data to an attached node port using the local clock substantially eliminates the transfer of "jitter" (time based noise, i.e., loss of precision in the signal) in the signal transmitted to a node port. This reduction in jitter reduces synchronization errors, improves the bit-error rate, and improves hub cascadability.

DETAILED DESCRIPTION

As described above, the invention will be explained below in the context of a Fibre Channel Arbitrated Loop ("FC-AL") as an illustration of preferred embodiments. However, the invention may have applicability to networks with similar characteristics as FC-AL networks.

In a preferred implementation, a hub port maintains constant phase in the datastream of the hub loop. As described above, the phase shift problem of conventional hub ports is typically caused by the difference in phase of the clocks for the datastreams entering the hub port. This implementation synchronizes data received from a node port to a local clock before introducing that data to the hub loop.

Each hub port may receive data from potentially two sources: an attached node port and an upstream hub port. While a hub port is not connected to a node port, the hub port is in bypass mode and passes data from the upstream hub port to a downstream hub port. When a node port is connected to a hub port and is transmitting valid data to the hub port, the hub port switches out of bypass mode and switches from outputting the datastream from the upstream hub port to outputting the datastream from the node port. The hub port monitors data received from the attached node port and synchronizes that data to the local clock signal using a smoothing circuit. The node port transmits data to the hub port using a clock internal to the node port. The hub port recovers the node port's clock signal from the data from the node port and uses that recovered clock signal to receive the data from the node port. The frequencies of the recovered clock signal and the local clock signal are typically similar but not necessarily the same and so the smoothing circuit inserts and deletes fill words from the datastream to compensate for lack of synchronization.

In addition, the hub port ensures that data from the node port enters the datastream of the loop only upon bit and word boundaries. Because each hub port in the hub inserts data into the hub loop using a local clock, the datastream on the hub loop is synchronized to the local clock. Because the datastream from the upstream hub port and the smoothed datastream from the node port are synchronized to a local clock, rather than using a clock signal recovered from the datastream from the node port, the switch from one datastream to another does not affect the phase of the datastream on the hub loop. Similarly, when an attached node port is disconnected or fails and the hub port switches into bypass mode, switching from the datastream from the node port to the datastream from the upstream hub port does not affect the phase of the hub loop datastream.

Figure 1:
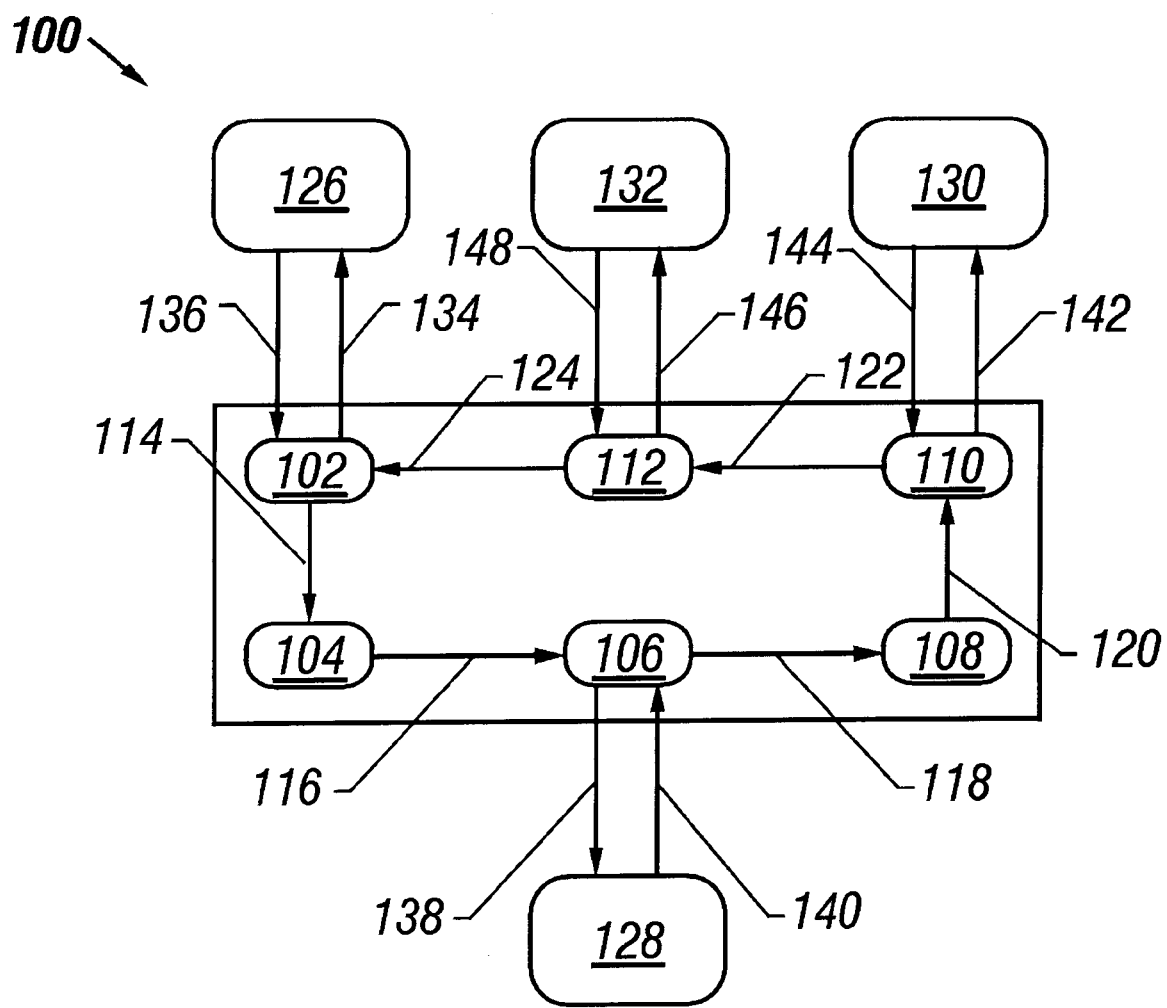
FIG. 1 shows a prior art configuration of a loop including a hub.
Figure 2:
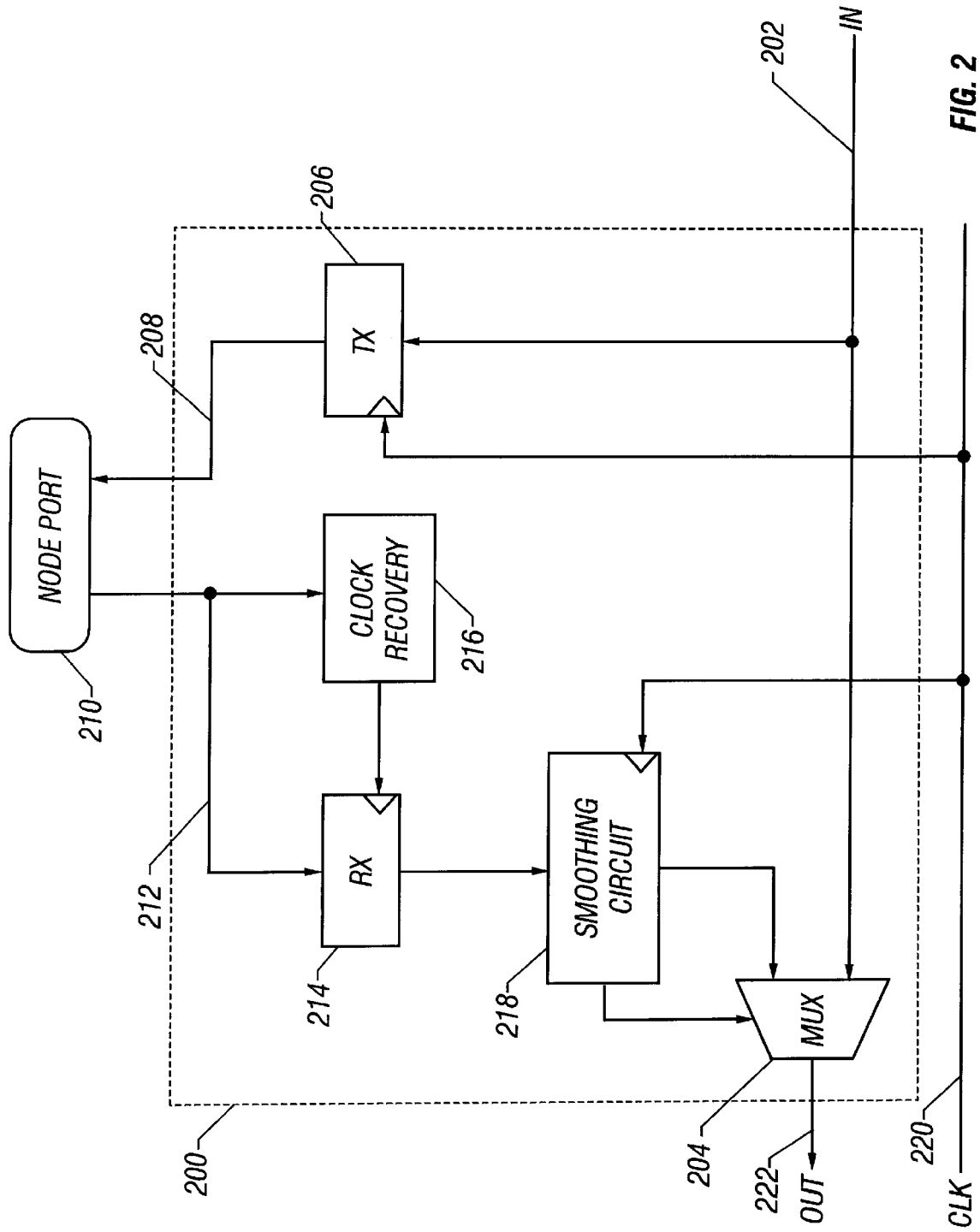
FIG. 2 is a block diagram of a first preferred implementation of a hub port.

More particularly, as shown in FIG. 2, a hub port 200 includes an incoming internal hub link 202 connected to a data input of a switching device such as a multiplexer 204 and to a transmit circuit 206. Transmit circuit 206 transmits data along data channel 208 to node port 210. Node port 210 transmits data to hub port 200 along data channel 212. Data channel 212 is connected to a receive circuit 214 and a clock recovery circuit 216. Clock recovery circuit 216 recovers a clock signal from data received from node port 210 and supplies that clock signal to receive circuit 214. Receive circuit 214 outputs data using the recovered clock signal to smoothing circuit 218. Smoothing circuit 218 is connected to a hub clock line 220. Hub clock line 220 is connected to a clock (not shown) which is internal to the hub containing hub port 200. Hub clock line 220 is connected to each hub port in the hub containing hub port 200. Smoothing circuit 218 outputs data to a data input of multiplexer 204 using the hub clock signal. Smoothing circuit 218 also supplies control signals to a control input of multiplexer 204 to control the selection of inputs for multiplexer 204. Multiplexer 204 outputs data onto outgoing internal hub link 222 into the hub loop of the hub containing hub port 200.

Hub port 200 synchronizes all data received from node port 210 to a local clock through smoothing circuit 218 and hub clock line 220. The data is then output onto outgoing internal hub link 222. All data entering the loop is synchronized to the same local clock because each hub port in the hub is connected to a common local clock. As described above, multiplexer 204 has two data inputs: one connected to smoothing circuit 218 and one connected to incoming internal hub link 202. Because all data on the internal hub links is synchronized to the same local clock as the local clock connected to smoothing circuit 218, the phases of the two datastreams are the same. Thus, when hub port 200 switches between the data inputs of multiplexer 204, the phase and bit boundaries of the datastreams received at downstream node ports are not disrupted.

Hub clock line 220 also supplies a local clock signal to transmit circuit 206. Transmit circuit 206 transmits data to node port 210 using the local clock signal. By transmitting with a clean clock signal rather than a recovered clock signal, the transfer of jitter (i.e., noise in the data signal which may accumulate as the signal passes through logic circuits) from hub port 200 to node port 210 is reduced and preferably eliminated.

Figure 3:
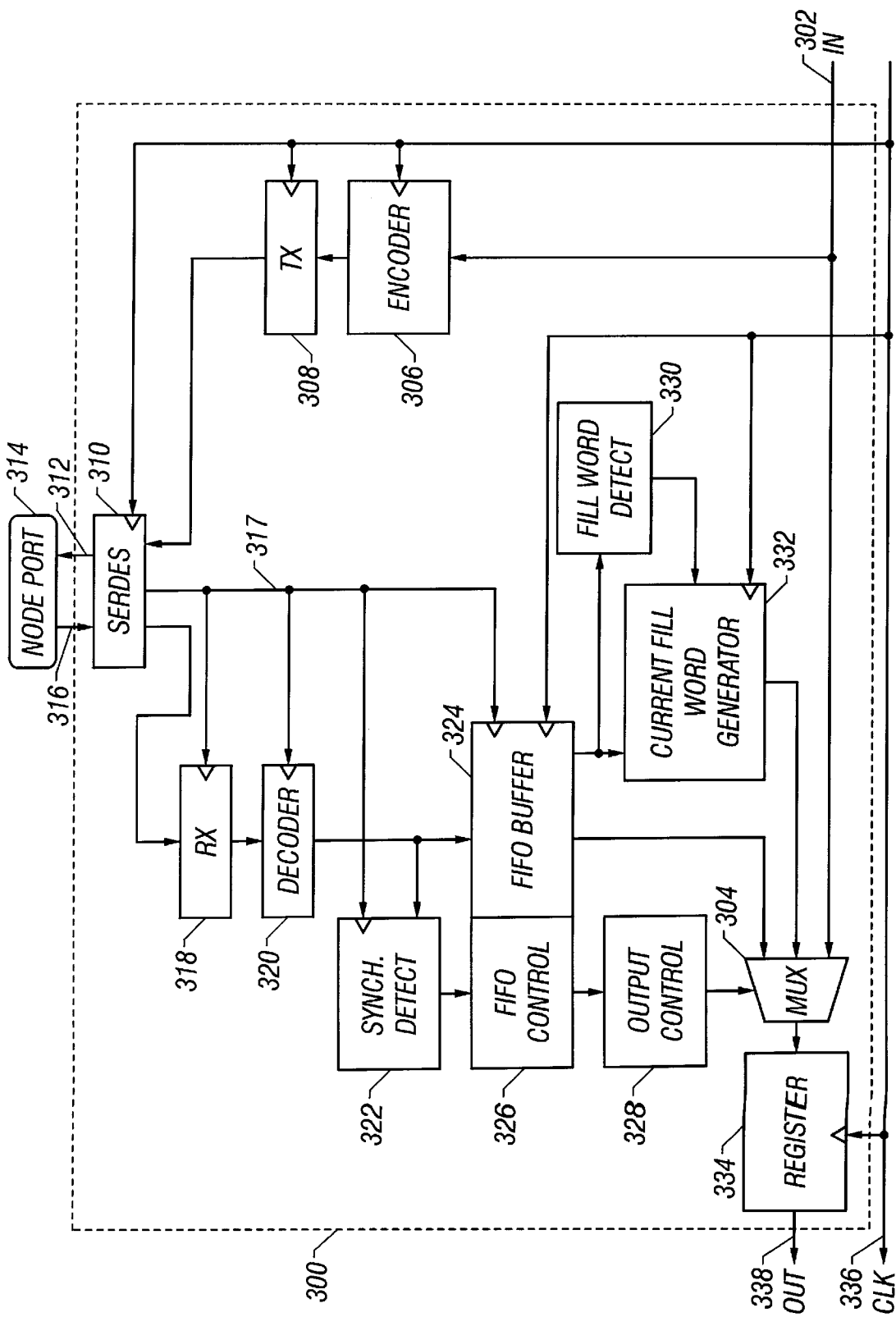
FIG. 3 is a block diagram of a second preferred implementation of a hub port.

FIG. 3 is a block diagram of a second preferred implementation of a hub port 300 showing the components in more detail. Hub port 300 includes components for transmitting data to a node port 314, for receiving data from node port 314, and for bypassing or inserting node port 314 in and out of the hub loop.

An incoming internal hub link 302 connects hub port 300 to an upstream hub port (not shown) in the loop of the hub containing hub port 300. Incoming internal hub link 302 is connected to a data input of a multiplexer 304 and to an encoder 306. Encoder 306 is preferably a conventional 8B/10B encoder. Encoder 306 is connected to a transmit circuit 308. Transmit circuit 308 is connected to a serializer/deserializer ("SERDES") circuit 310. SERDES circuit 310 serializes data and sends the data through a data channel 312 to node port 314. Each of encoder 306, transmit circuit 308, and SERDES circuit 310 is connected to hub clock line 336 and outputs data using that clock signal. Thus, data is transmitted to node port 314 using a clean clock signal. Accordingly, the data signal to node port 314 is clean and substantially no jitter is transferred in the data signal from an upstream node port to node port 314.

A data channel 316 carries data from node port 314 to SERDES circuit 310. SERDES circuit 310 deserializes serial data received from node port 314 and passes the data to a receive circuit 318. SERDES circuit 310 also recovers a clock signal from the deserialized data. SERDES circuit 310 sends the recovered clock signal via a recovered clock line 317 to receive circuit 318, a word synchronization detect circuit 322 and a "smoothing" first-in-first-out ("FIFO") buffer 324. Alternatively, smoothing buffer 324 need not be a FIFO buffer.

Receive circuit 318 passes the data to a decoder 320. Decoder 320 is preferably a conventional 10B/8B decoder. Decoder 320 passes the decoded data to word synchronization detect circuit 322 and smoothing FIFO buffer 324. Word synchronization detect circuit 322 is connected to a smoothing FIFO control circuit 326, which is also coupled to smoothing FIFO buffer 324. Smoothing FIFO buffer 324 is connected to a data input of multiplexer 304, a fill word detect circuit 330, and a current fill word generator 332. Current fill word generator 332 is connected to fill word detect circuit 330 and to a data input of multiplexer 304. Smoothing FIFO control circuit 326 is connected to a hub port output control circuit 328, which is connected to a control input of multiplexer 304. Multiplexer 304 is connected to an output register 334.

A hub clock line 336 is connected to a local clock (not shown). The local clock is preferably connected to each hub port in the hub and supplies a common local clock signal to each hub port in the hub. Hub clock line 336 supplies a local clock signal to encoder 306, transmit circuit 308, SERDES circuit 310, smoothing FIFO buffer 324, current fill word generator 332, and output register 334.

Output register 334 outputs data from multiplexer 304 onto outgoing internal hub link 338 using the local clock. Output register 334 functions as a pipeline stage between connecting hub ports.

In receiving data from an attached node port 314, an important part of the preferred hub port design is smoothing FIFO buffer 324 and smoothing FIFO control circuit 326. Smoothing FIFO buffer 324 in conjunction with smoothing FIFO control circuit 326 synchronizes data received from node port 314 to the internal clock of the hub port. Smoothing FIFO buffer 324 provides a smoothing function between the two potentially asynchronous clock domains of the clock signal recovered from the data and the local clock of hub port 300.

In operation, when hub port 300 is connected to and receiving data from node port 314, SERDES circuit 310 deserializes an incoming serial datastream from node port 314, generating deserialized 10B-encoded data. SERDES circuit 310 also recovers a clock signal from the serial data. SERDES circuit 310 outputs the recovered clock signal to recovered clock line 317 to be received by receive circuit 318, word synchronization detect circuit 322 and smoothing FIFO buffer 324. Receive circuit 318 receives the 10B-encoded data and outputs the data to decoder 320, synchronized to the recovered clock signal. Decoder 320 then performs a 10B/8B decoding of the data. The decoded data is forwarded to word synchronization detect circuit 322 and smoothing FIFO buffer 324.

Word synchronization detect circuit 322 preferably follows procedures defined in clause 12.1 of ANSI publication X3.230-1994 (FC-PH, Rev 4.3, Jun. 1, 1994). In particular, when word synchronization detect circuit 322 detects three consecutive valid Fibre Channel ordered sets emerging from decoder 320, hub port 300 has acquired word synchronization and word synchronization detect circuit 322 enters a synchronization-acquired state. Word synchronization detect circuit 322 enables smoothing FIFO control circuit 326, which in turn enables subsequent Fibre Channel words to be written into smoothing FIFO buffer 324. However, whenever a number of invalid Fibre Channel words specified by Fibre Channel protocols are decoded by decoder 320 and detected by word synchronization detect circuit 322, word synchronization detect circuit 322 enters a synchronization-lost state. Smoothing FIFO control circuit 326 disables words from being written into smoothing FIFO buffer 324 if word synchronization is lost.

Smoothing FIFO buffer 324 includes a FIFO buffer and, in conjunction with smoothing FIFO control circuit 326, synchronizes the received Fibre Channel data to the local clock frequency on hub clock line 336. Data received from node port 314 is written into smoothing FIFO buffer 324 at a data rate determined by the recovered clock on recovered clock line 317. The data is synchronized to the local clock signal determined by a local oscillator (not shown in FIG. 3) within the hub. Data is output from smoothing FIFO buffer 324 into multiplexer 304 at a data rate determined by the local clock signal on hub clock line 336.

Multiplexer 304 outputs data into output register 334. Switching of multiplexer 304 is controlled by hub output control circuit 328, which is connected to the control input of multiplexer 304. When data received from node port 314 is to be inserted into the loop, the data input corresponding to smoothing FIFO buffer 324 is selected. When fill words are to be inserted into the loop (described below), the data input corresponding to current fill word generator 330 is selected. When hub port 300 is in a bypass mode, the data input corresponding to incoming internal hub link 302 is selected. Each of the datastreams have the same phase and switching among the data inputs occurs on bit boundaries to preserve the constant phase. Output data register 334 outputs data onto outgoing internal hub link 338 using the local clock signal received on hub clock line 336.

The recovered clock frequency and the local clock frequency may vary by a small amount, such as ±100 ppm. The difference in the recovered and local clock frequencies results in a difference between the data rates for writing data into (using the recovered clock signal) and removing data from (using the local clock signal) smoothing FIFO buffer 324. Smoothing FIFO control circuit 326 "smooths" out the differences in incoming and outgoing data rates for smoothing FIFO buffer 324 using fill words. Fill words are typically inserted into inter-frame gaps between data frames in Fibre Channel datastreams. Essentially every datastream includes some number of fill words. A current fill word is typically selected from a list formed according to FC-AL protocols. By scheduling either insertions or deletions of current fill words when the amount of data in smoothing FIFO buffer 324 reaches various thresholds, smoothing FIFO control circuit 326 prevents smoothing FIFO buffer 324 from running dry or from overflowing. When smoothing FIFO control circuit 326 determines that deleting a fill word is appropriate, smoothing FIFO control circuit 326 waits until a suitable fill word is found in an inter-frame gap before a delete is performed. When an insert is appropriate, smoothing FIFO control circuit 326 waits for an inter-frame gap and then causes multiplexer 304 to select the data input corresponding to current fill word generator 332 to be output to output register 334. At the same time, smoothing FIFO control circuit 326 temporarily stalls data reads from smoothing FIFO buffer 324. Connected to current fill word generator 332 is fill word detect circuit 330. Fill word detect circuit 330 keeps track of the latest suitable fill word by updating current fill word generator 332 with the fill word to be used if a fill word insert is appropriate.

As data is removed from smoothing FIFO buffer 324 and output to multiplexer 304, if the local clock frequency is faster than the recovered clock frequency, the amount of data in smoothing FIFO buffer 324 diminishes. The amount of data in smoothing FIFO buffer 324 may also diminish when writing into smoothing FIFO buffer 324 is disabled due to loss of word synchronization. If the amount of data in smoothing FIFO buffer 324 falls below a minimum threshold, smoothing FIFO control circuit 326 causes hub port output control circuit 328 to bypass hub port 300. Hub port output control circuit 328 causes multiplexer 304 to select the data input corresponding to incoming internal hub link 302 to output data directly from the upstream hub port rather than the output of smoothing FIFO buffer 324. Once the amount of data in smoothing FIFO buffer 324 again exceeds the minimum threshold, smoothing FIFO control circuit 326 causes hub port output control circuit 328 to end the bypass. Hub port output control circuit 328 causes multiplexer 304 to select data from smoothing FIFO buffer 324, returning node port 314 to the loop. Alternatively, different thresholds may be used for removing and inserting node ports into the loop.

If the local clock frequency is slower than the recovered clock frequency, the amount of data in smoothing FIFO buffer 324 increases. If the amount of data in smoothing FIFO buffer 324 exceeds a maximum threshold, smoothing FIFO control circuit 326 deletes fill words as described above.

In operation, when hub port 300 is not connected to a node port 314, hub port 300 is in bypass mode. Multiplexer 304 connects the data input corresponding to incoming internal hub link 302 to output register 334. When node port 314 is initially connected to hub port 300 and begins transmitting a datastream, a process similar to that described above occurs. The data is deserialized by SERDES circuit 310, decoded by decoder 320, and supplied to word synchronization detect circuit 322. If valid ordered sets are being received, word synchronization detect circuit 322 enters a synchronization-acquired state and the received data starts to be written into smoothing FIFO buffer 324. As data continues to be written into smoothing FIFO buffer 324, smoothing FIFO buffer 324 exceeds a minimum threshold. At this point, smoothing FIFO control circuit 326 causes hub port output control circuit 328 to end bypass mode for hub port 300. Hub port output control circuit 328 causes multiplexer 304 to select the data input corresponding to smoothing FIFO buffer 324 rather than data from the upstream hub port on incoming internal hub link 302. Because data received from node port 314 is inserted into the loop using a local clock signal to read data out of smoothing FIFO buffer 324, node port 314 is inserted into the loop without disrupting the synchronization of the datastream.

In operation, when the datastream being received by hub port 300 from node port 314 is disrupted, such as by loss of bit or word synchronization in the datastream, failure of node port 314, or disconnection of node port 314, word synchronization detect circuit 322 detects the loss of valid synchronized data and enters a synchronization-lost state. Subsequent data is not written into smoothing FIFO buffer 324. Data continues to be removed from smoothing FIFO buffer 324 and output by multiplexer 304 to output register 334 causing smoothing FIFO buffer 324 to approach empty. As described above, when smoothing FIFO control circuit 326 detects that smoothing FIFO buffer 324 has fallen below a minimum threshold, smoothing FIFO control circuit 326 causes hub port output control circuit 328 to bypass hub port 300. Hub port output control circuit 328 causes multiplexer 304 to select the data input corresponding to incoming internal hub link 302 and data from the upstream hub port. Thus, while valid data is not received from node port 314, hub port 300 enters a bypass mode. Because the bypass occurs in synchronization with the local clock signal, the failure of node port 314 does not disrupt the datastream of the loop.

In transmitting data from hub port 300 to node port 314, encoder 306 encodes the un-encoded Fibre Channel data, preferably using 8B/10B encoding, received along incoming internal hub link 302 from the upstream hub port. Encoder 306 does not incorporate a clock signal recovered by the SERDES circuit of an upstream hub port because that recovered clock signal is not sent by that upstream hub port. As described above, data is output onto outgoing internal hub link 338 of a hub port using the local clock signal on hub clock line 336, not the recovered clock signal. Encoder 306 preferably incorporates the local clock signal on hub clock line 336. The encoded data is forwarded to transmit circuit 308. Transmit circuit 308 ensures that only complete words are transmitted to node port 314. In addition, transmit circuit 308 automatically adjusts the running disparity (i.e., the difference between the number of 1's and 0's in the data signal) of the data as necessary, such as by changing the disparity to positive or negative. The data is passed to SERDES circuit 310 to be serialized and transmitted to node port 314 using the local clock on hub clock line 336. As described above, by transmitting data to node port 314 using the local clock signal, substantially no jitter which may have accumulated in the datastream is transferred to node port 314.

In this manner, a node port or a loop segment of multiple node ports may be seamlessly inserted into or removed from the loop by a hub port without causing a disruption in the phase of data transmitted to the downstream node port. In addition jitter transfer between hub ports is substantially eliminated.

A number of embodiments of the invention have been described. However, these embodiments are illustrative and not limiting. Alternative embodiments and variations will be apparent to one of ordinary skill in the art. The scope of the invention is limited only by the scope of the following claims.

What is claimed is:

1. A hub port for connecting a hub to a node port, where the hub includes at least two hub ports interconnected in a loop with internal hub links, the hub port comprising:

(a) a hub clock line connected to a local clock internal to the hub for supplying a local clock signal;

(b) a multiplexer which includes a first data input, a second data input, a third data input, and a control input;

(c) a hub output register connected to the multiplexer, and to the hub clock line;

(d) an incoming internal hub link connected to the third data input of the multiplexer;

(e) an outgoing internal hub link connected to the hub output register;

(f) a transmit circuit connected to the incoming internal hub link and to the hub clock line;

(g) an encoder connected to the transmit circuit and to the hub clock line;

(h) a current fill word generator connected to the second data input of the multiplexer and to the hub clock line;

(i) a fill word detect circuit connected to the current fill word generator;

(j) a smoothing buffer connected to the first data input of the multiplexer, the current fill word generator, the fill word detect circuit, and to the hub clock line;

(k) a smoothing control circuit connected to the smoothing buffer;

(l) a hub port output control circuit connected to the smoothing control circuit and the control input of the multiplexer;

(m) a word synchronization detect circuit connected to the smoothing control circuit;

(n) a receive circuit connected to the word synchronization detect circuit and the smoothing buffer;

(o) a decoder connected to the receive circuit; and (p) a serializer/deserializer circuit connected to the encoder, the decoder, the node port, and to the hub clock line, where the serializer/deserializer circuit includes a recovered clock output connected to the decoder, the word synchronization detect circuit, and the smoothing buffer.

2. The hub port of claim 1 where the smoothing buffer is a FIFO buffer.

3. The hub port of claim 1 where the encoder is a 8B/10B encoder.

4. The hub port of claim 1 where the decoder is a 10B/8B decoder.

5. The hub port of claim 1 where the local clock is contained in the hub port.

6. The hub port of claim 1 where the transmit circuit ensures that only full words of data are transmitted to the node port.

7. The hub port of claim 1 where the transmit circuit sends data to the node port using the local clock signal.

8. A method of maintaining constant phase in data output by a hub port for connecting a hub to a node port, where the hub includes at least two hub ports interconnected in a loop, the method comprising:

(a) sending data from the node port to the hub port;

(b) deserializing the data from the node port;

(c) recovering a recovered clock signal from the data from the node port;

(d) decoding the deserialized data;

(e) checking the decoded data for word synchronization;

(f) writing the decoded data to a buffer using the recovered clock signal;

(g) reading the decoded data from the buffer using a clock signal local to the hub;

(h) outputting the decoded data from the hub port;

(i) repeating steps (e) to (h) so long as the data received from the node port is word synchronized;

(j) while word synchronization is lost, outputting data from the hub port which is received from another hub port in the hub;

(k) when an amount of data in the buffer falls below a minimum threshold, outputting at least one current fill word from the hub port; and (l) when the amount of data in the buffer exceeds a maximum threshold, deleting at least one fill word from the data stored in the buffer.

9. The method of claim 8 further comprising:

(a) synchronizing data from an upstream hub port to the local clock signal; and (b) transmitting the synchronized data from the upstream hub port to the node port.

* * * * *